US006950722B2

(12) United States Patent
Mountz

(10) Patent No.: US 6,950,722 B2
(45) Date of Patent: Sep. 27, 2005

(54) MATERIAL HANDLING SYSTEM AND METHOD USING MOBILE AUTONOMOUS INVENTORY TRAYS AND PEER-TO-PEER COMMUNICATIONS

(75) Inventor: Michael C. Mountz, Palo Alto, CA (US)

(73) Assignee: Distrobot Systems, Inc., Burlington, MA (US)

( * ) Notice: Subject to any disclaimer, the term of this patent is extended or adjusted under 35 U.S.C. 154(b) by 112 days.

(21) Appl. No.: 10/196,772

(22) Filed: Jul. 15, 2002

(65) Prior Publication Data

US 2004/0010339 A1 Jan. 15, 2004

(51) Int. Cl.[7] .................................................. G06F 7/00

(52) U.S. Cl. ....................... 700/214; 700/113; 700/216; 700/248; 700/255; 701/23

(58) Field of Search ................................ 700/213, 214, 700/216, 217, 225, 226, 228, 113, 245, 243, 255; 701/1, 2, 23, 301, 300, 213

(56) References Cited

U.S. PATENT DOCUMENTS

| | | | | |
|---|---|---|---|---|
| 4,542,808 A | | 9/1985 | Lloyd, Jr. et al. | |
| 4,669,047 A | | 5/1987 | Chucta | 364/468 |
| 4,678,390 A | | 7/1987 | Bonneton et al. | |
| 4,716,530 A | * | 12/1987 | Ogawa et al. | 701/23 |
| 4,780,817 A | * | 10/1988 | Lofgren | 701/23 |
| 4,789,940 A | * | 12/1988 | Christian | 700/113 |
| 4,996,468 A | | 2/1991 | Field et al. | |
| 5,179,329 A | | 1/1993 | Nishikawa et al. | |
| 5,187,664 A | * | 2/1993 | Yardley et al. | 701/23 |
| 5,228,820 A | | 7/1993 | Stansfield et al. | |
| 5,283,739 A | * | 2/1994 | Summerville et al. | 701/23 |
| 5,362,197 A | | 11/1994 | Rigling | |
| 5,395,199 A | | 3/1995 | Day, III et al. | |
| 5,434,490 A | | 7/1995 | Ishida et al. | |
| 5,568,030 A | | 10/1996 | Nishikawa et al. | |
| 5,652,489 A | | 7/1997 | Kawakami | |
| 5,663,879 A | * | 9/1997 | Trovato et al. | 701/2 |
| 5,793,934 A | | 8/1998 | Bauer | |
| 5,800,777 A | | 9/1998 | Jehan | |

(Continued)

FOREIGN PATENT DOCUMENTS

| | | |
|---|---|---|
| EP | 0 458 722 A1 | 11/1991 |
| EP | 1 251 083 A1 | 10/2002 |

OTHER PUBLICATIONS

*A War of Robots, All Chattering on the Western Front*; Noah Shachtman http://www.nytimes.com/2002/07/11/technology/circuits/11NEXT.html.

(Continued)

*Primary Examiner*—Khoi H. Tran
(74) *Attorney, Agent, or Firm*—Baker Botts L.L.P.

(57) ABSTRACT

An inventory system including a plurality of mobile inventory trays with a positioning system that enables the mobile inventory trays to determine their three-dimensional coordinates within a facility and thereby navigate a factory floor. The mobile inventory trays are also equipped with a communication system in order to determine optimum mobile inventory trays to fill order requests for items of inventory. The mobile inventory trays interface with a material handling system to receive order requests and deliver inventory items to pack stations located on the factory floor. The resulting system is a real-time parallel-processing order fulfillment and inventory management system. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

76 Claims, 10 Drawing Sheets

U.S. PATENT DOCUMENTS

| | | | | |
|---|---|---|---|---|
| 5,801,506 | A | | 9/1998 | Netzler |
| 5,819,008 | A | | 10/1998 | Asama et al. |
| 5,825,981 | A | * | 10/1998 | Matsuda ..................... 700/248 |
| 5,928,952 | A | | 7/1999 | Hutchins et al. |
| 6,049,745 | A | | 4/2000 | Douglas et al. |
| 6,061,607 | A | | 5/2000 | Bradley et al. |
| 6,208,908 | B1 | | 3/2001 | Boyd et al. |
| 6,317,648 | B1 | | 11/2001 | Sleep et al. |
| 6,339,764 | B1 | | 1/2002 | Livesay et al. |
| 6,351,685 | B1 | | 2/2002 | Dimitri et al. |
| 6,356,838 | B1 | | 3/2002 | Paul |
| 6,421,579 | B1 | | 7/2002 | Dimitri et al. |
| 6,463,360 | B1 | * | 10/2002 | Terada et al. ............... 700/257 |
| 2002/0063225 | A1 | | 5/2002 | Payton |

OTHER PUBLICATIONS

*Emergence–The Connected Lives of Ants, Brains, Cities, and Software*; Steven Johnsonn; Part Two "Street Level" pp. 73–100; NY, NY, 2001.

*New Rules for the New Economy–10 Radical Strategies for a Connected World*; Kevin Kelly; Chapter 1 "Embrace the Swarm" pp. 1–22; NY, NY, 1998.

*Pheromone Robotics*; David Payton; Presentation given to the Defense Advance Research Project Agency in Nashville, TN; Jul. 17, 2001.

"Progress in Pheromone Robotics," *7th International Conference on Intelligent Autonomous Systems*, D. Payton, R. Estkowski, M. Howard, Mar. 25–27, 2002, Marina del Rey, CA.

"Autonomy–Oriented Computation in Pheromone Robotics," *Working Notes of the First International Workshop on Autonomy Oriented Computation (AOC–01)*, pp. 69–77, D. Payton, M.Daily, B.Hoff, M.Howard, C.Lee, May 28–Jun. 1, 2001, Montreal, Canada.

"Pheromone Robotics", *Autonomous Robots*, vol. 11, No. 3, Kluwer Academic Publishers, Norwell, MA, Nov. 2001, pp. 319–324.

* cited by examiner

MATERIAL HANDLING SYSTEM AND METHOD USING MOBILE AUTONOMOUS INVENTORY TRAYS AND PEER-TO-PEER COMMUNICATIONS

FIELD OF THE INVENTION

The present invention relates generally to the field of material handling, more particularly, to systems and methods of material handling using mobile inventory trays.

BACKGROUND

The order fulfillment step in the distribution system process is often one of the largest cost components in moving inventory from production to end consumer. This is due to the fact that final order assembly is typically labor intensive and time consuming as operators move among inventory locations and manually handle items. The order fulfillment step involves selecting multiple individual inventory items from among a large assortment of possible items. In contrast, the steps prior to the order fulfillment step in the distribution system process are generally more efficient since they handle inventory in bulk operations such as moving a truckload at a time, a full pallet of one product, or even whole cases.

Due to its large labor costs, order fulfillment operations have long been the focus of innovations designed to reduce labor. These developments have taken the form of pick-to-light technology, wireless barcode readers, conveyor systems that move orders to operators and even automated storage and retrieval systems ("ASRS") that bring the inventory to the worker. Common ASRS solutions are sometimes called carousels or stockers. A typical carousel may have several thousand storage bins installed in a rotating structure that operates similar to the spinning clothes rack at a dry cleaning facility. Another type of solution known as a tilt-tray sorter can combine an ASRS with an automated, revolving tray mechanism that helps sort items coming from inventory into their target order bins. Yet another solution is to provide fixed racking aisles served by a gantry robot that moves in and out of the aisles to bring inventory to the front of the storage system.

These solutions have been embraced by the distribution industry for their ability to streamline operations and cut operating costs. Yet fulfillment costs remain high and distribution system managers are under continuous pressure to trim operating costs.

One major shortcoming of the current set of order fulfillment solutions is complexity. These automated systems often involve complex control software, lengthy installation integration and bring-up time, and fail to perform robustly over long periods. Current solutions must be monitored, tuned, and managed by experts with sophisticated knowledge of the system's workings. In addition, these systems are often inflexible to new processes that may be required as an organization's needs change.

What is needed is an order fulfillment system that is simple to install, operate, and maintain, and that would further reduce operating costs.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Figure 1:
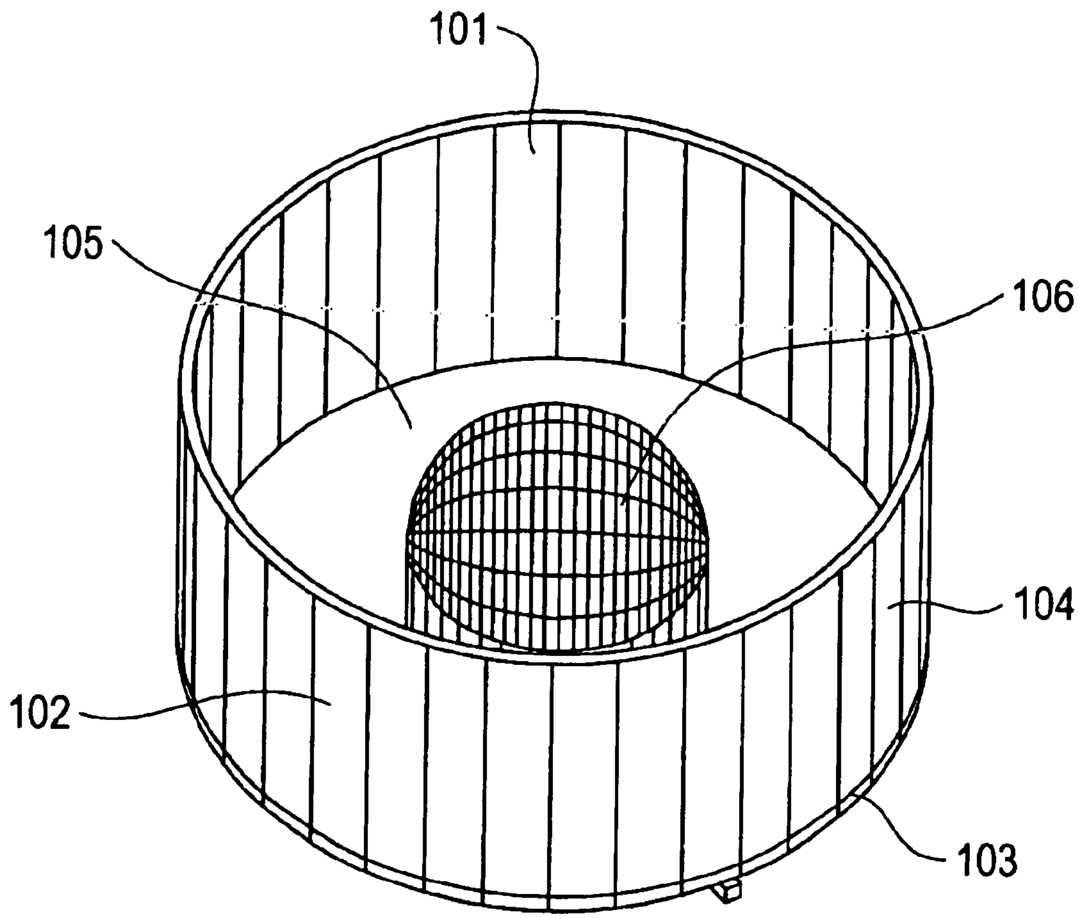
FIG. 1 is a top perspective view of a mobile inventory tray according to one embodiment of the present invention.

A material handling system and method using mobile autonomous inventory trays and peer-to-peer communications is disclosed. In the following description numerous specific details are set forth, such as the particular configuration of mobile inventory trays, the use of mobile inventory trays on a factory floor, and details regarding communication technologies, etc., in order to provide a thorough understanding of the present invention. However, persons having ordinary skill in the material handling arts will appreciate that these specific details may not be needed to practice the present invention.

According to an embodiment of the present invention, autonomous mobile inventory trays, which are robotic devices, are used to extend the concept of bringing a storage location to an operator (e.g., a person, a robot, etc.) in a novel way. Inventory is stored in mobile trays that can move in any direction under their own power within an established storage area of an organization (e.g., a factory floor). There are no predetermined storage locations for the mobile inventory trays other than that they exist somewhere within a designated space (e.g., an enclosed factory floor). The mobile inventory trays are free to move in any direction necessary including up and down ramps to other inventory floor levels. In this manner, the mobile inventory trays can respond to pick requests and move to pack station locations as part of the pick-and-pack order filling process. The mobile inventory trays may communicate with each other via radio frequency ("RF") technology (e.g., the Bluetooth wireless protocol link) or other types of peer-to-peer communication. The mobile inventory trays may use a pseudolite indoor global positioning system ("GPS") to provide themselves with an accurate position of their location within the predefined inventory storage area. The mobile inventory trays may then use this GPS information to calculate routes to a pack station, and their peer-to-peer communications ability to coordinate clear paths on the factory floor, or to queue with other trays at control nodes.

The mobile inventory trays of the present invention are thus automatic unguided vehicles (an "AUV") rather than automatic guided vehicle (an "AGV"). They are able to navigate the factory floor autonomously using information obtained from the on-board GPS and RF communication systems without any guidance assistance from a remote central computer. This system of mobile inventory trays is therefore self-tuning and self-optimizing. Frequently requested trays migrate closer to the pack stations, while trays containing slower moving inventory items drift back and to the sides and may even move to upper levels. In this sense, the material handling system and method of the present invention is a complex adaptive system and demonstrates emergent system behavior.

As with all material handling systems, the autonomous storage and retrieval system and method of the present invention may integrate with existing warehouse management software ("WMS") systems. For example, order requests may be made from a WMS to the material handling system ("MHS") and relayed to the appropriate pack station computers which then direct the order fulfillment from inventory brought to the pack stations utilizing the mobile inventory trays. Orders may be processed in parallel, i.e., multiple orders may be filled simultaneously at a given pack station and multiple pack stations can operate concurrently. Parallel processing of orders allows for real-time fulfillment of orders, in that multiple orders may be filled in minutes rather than in hours. Operators pick the inventory items from the arriving trays, place the items in the order container and, when the order is complete, the pack station computer relays this information to the MHS which in turn notifies the WMS.

Referring now to FIG. 1 there is shown a perspective view of a mobile inventory tray 101 according to one embodiment of the present invention. Mobile inventory tray 101 is designed so that it may move autonomously on a surface, such as a factory floor (not shown in this view). Although mobile inventory tray 101 may be specifically discussed in reference to its movement on a factory floor, it should be noted that mobile inventory tray 101 may be used in a variety of capacities including those typified by pick-and-pack operations, order fulfillment operations, or assembly line operations where a few items are drawn from a large population of possible items. An example of such an operation is where a single item is drawn from a large population of books, movies, food supplies, subsystem parts, etc.

Mobile inventory tray 101 comprises an enclosure 102 to contain various inventory items (not show in this view). In the embodiment illustrated by FIG. 1, the enclosure is a circular, one-piece assembly container having a base or bottom wall 103 and a side wall 104 extending upwardly from the bottom wall 103 to create a compartment 105 for the inventory items. It should be noted that the mobile inventory tray does not necessarily need to be circular, as is shown in FIG. 1. The design of the mobile inventory tray 101 may vary in size and shape based on the type of inventory items the factory stores. Mobile inventory tray 101 also contains a housing 106 for its drive system and control electronics which will be described in more detail later.

Figure 2A:
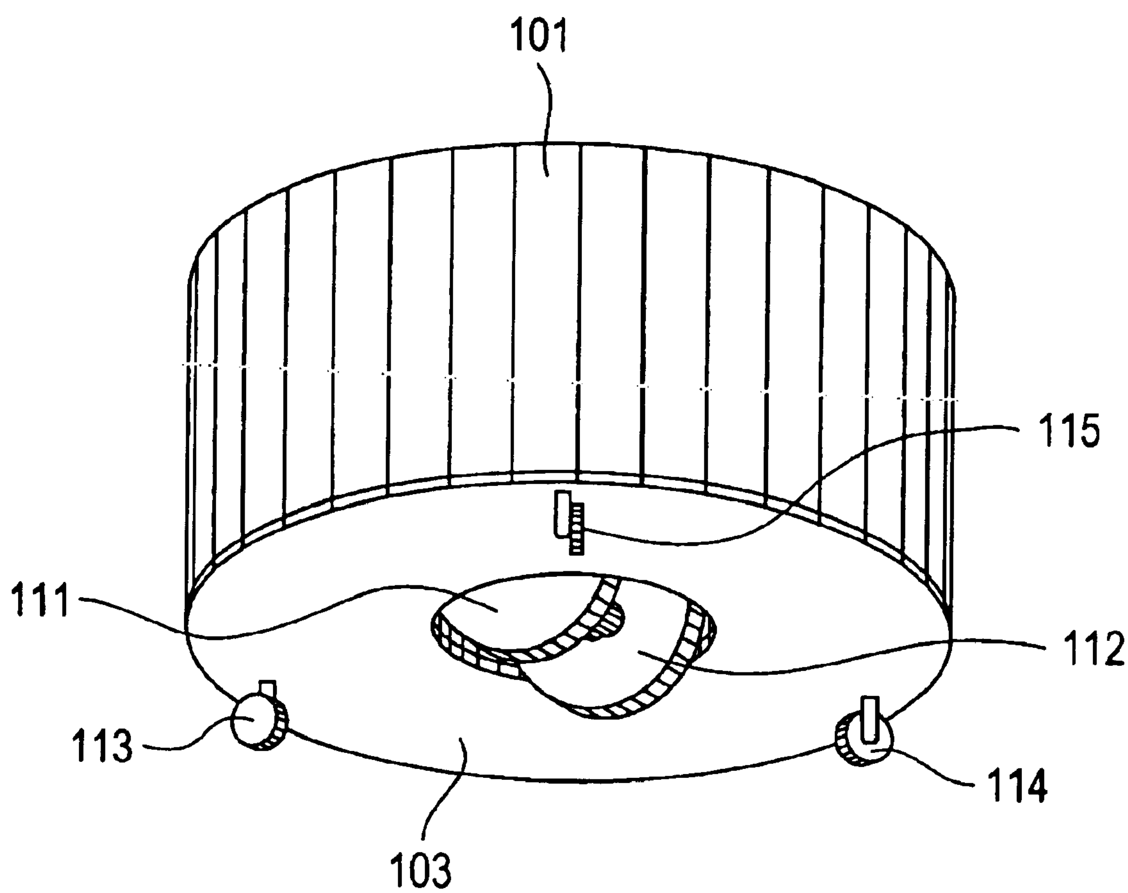
FIG. 2A is a bottom perspective view of a mobile inventory tray according to one embodiment of the present invention.

Referring now to FIG. 2A there is shown a bottom perspective view of a mobile inventory tray 101. Two driving wheels 111 and 112 and three small freely-rotating casters 113–115 are shown mounted to the base 103 of the mobile inventory tray 101. The driving wheels 111 and 112 are operated by motors (not shown in this view) located in the housing 106 of mobile inventory tray 101. The drive wheels 111 and 112 always remain in contact with the factory floor. Casters 113–115 function to support the load and maintain mobile inventory tray 101 in rolling contact with the floor despite imbalances in the items contained in enclosure 102. The motors may be attached to the driving wheels 111 and 112 in a conventional manner.

Figure 2B:
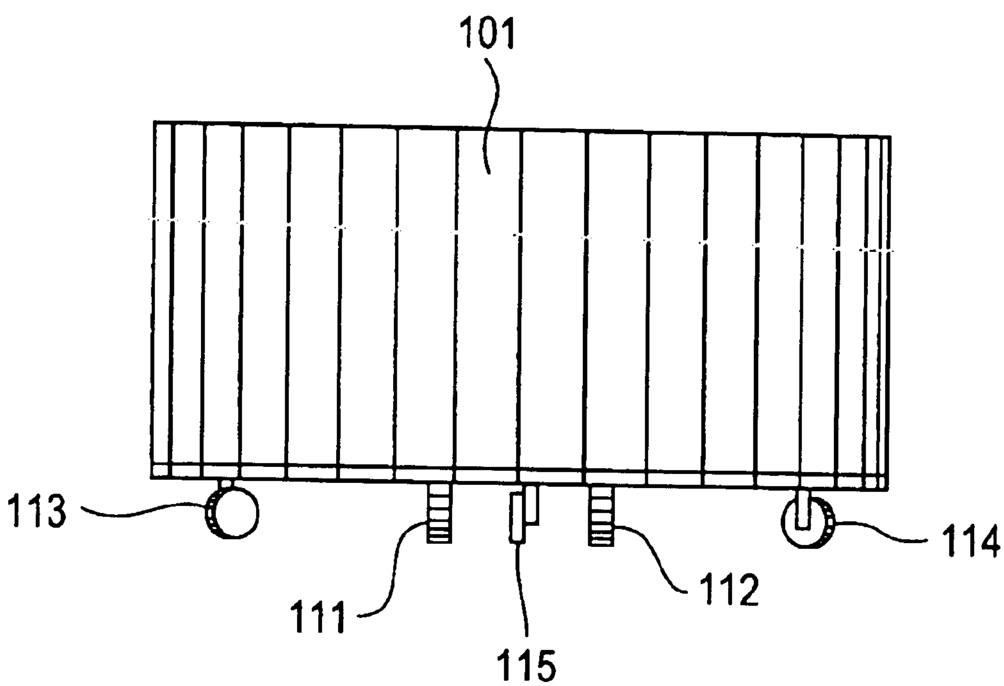
FIG. 2B is a front side view of the mobile inventory tray of FIG. 2A.

FIG. 2B is a front side view of the mobile inventory tray of FIG. 2A. Casters 113–115 roll freely and balance the mobile inventory tray 101 as it moves along a surface (not shown in this view) by using the driving wheels 111 and 112. It should be noted that the mobile inventory tray 101 may use other locomotion means as well, including motor driven tracks, propellers, ball-wheels or a combination of locomotion devices.

Figure 3:
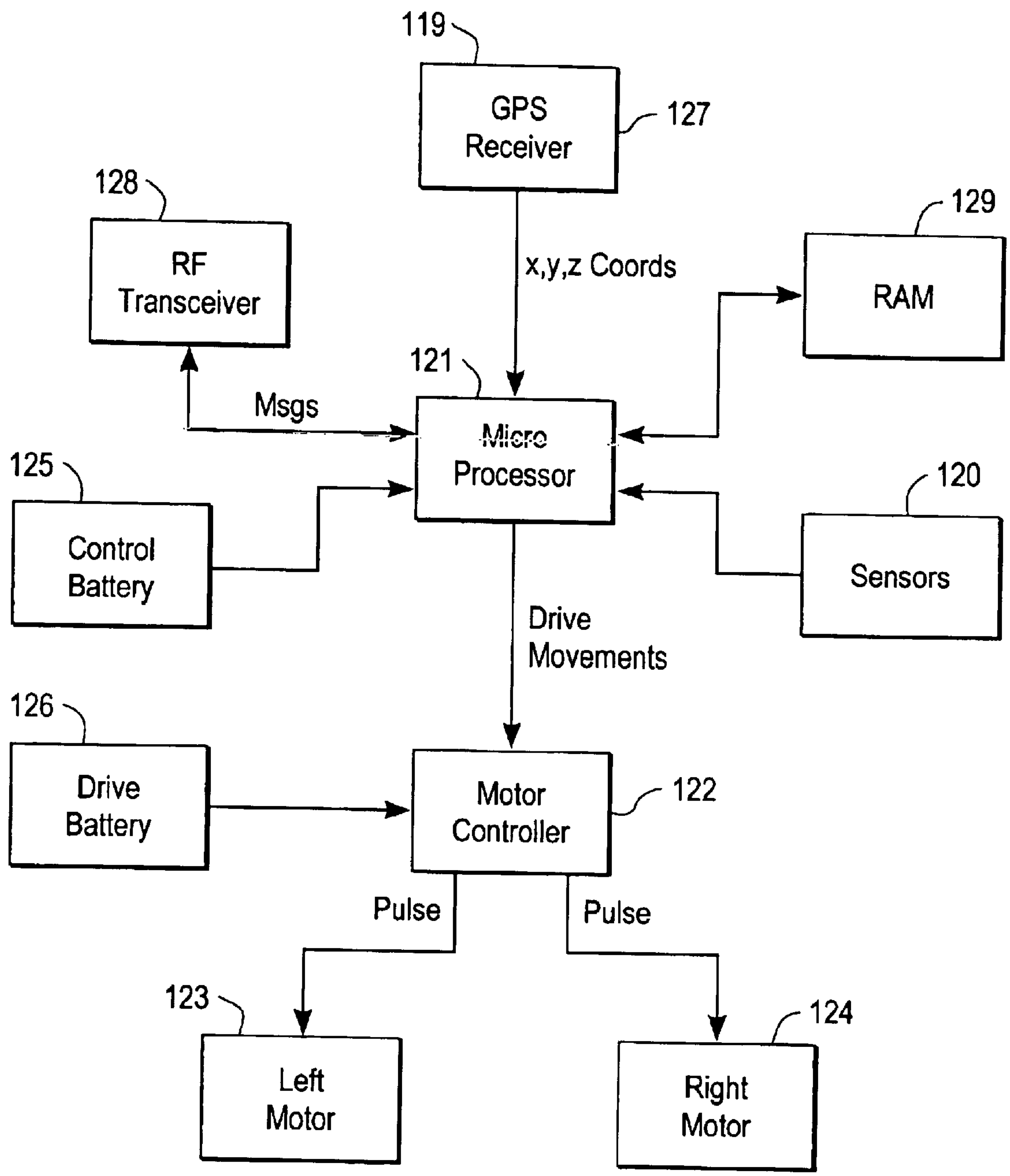
FIG. 3 is a high-level system block diagram of tray subsystems according to one embodiment of the present invention.

FIG. 3 is a high-level block diagram of the subsystems of a mobile inventory tray according to one embodiment of the present invention. The mobile inventory tray subsystem may be implemented as a computer-based (i.e., microprocessor-based) device. For instance, all of the elements shown in FIG. 3 may be contained within housing 106 (see FIG. 1) secured to the mobile inventory tray.

A motor controller 122 controls the movement of the mobile inventory tray in response to drive movement commands received from microprocessor 121. Motor controller 122 is coupled to provide pulse signals to a left motor 123 and a right motor 124. The motors 123 and 124 are coupled to the drives wheels (see FIG. 1) which propel the mobile inventory tray forward and backward in response to the signals provided by controller 122. A control battery 125 and a drive battery 126 provide the electrical power for operating the electrical systems 122 and drive motors 123 and 124. The mobile inventory tray may move to and couple with charging stations (not shown) as needed to replenish the battery power.

Microprocessor 121 of the mobile inventory tray subsystem 119 provides the intelligence for the mobile inventory tray. A random-access ("RAM") 129 memory may be included to provide memory storage and as a source of data. A global positioning system ("GPS) receiver 127, radio frequency ("RF") communication transceiver 128, and sensors 120 provide signals to microprocessor 121. For example, GPS receiver 127 outputs position coordinates (x, y, z), while transceiver 128 provides command and other messages, and sensors 120 provide signals to microprocessor 121. Sensors may include infrared, optical, acoustic, contact, laser, sonar, magnetic, etc. common to mobile robotic vehicles for the purpose of identifying obstacles, avoiding collisions, finding edge limits etc. Microprocessor 121 may also send information (e.g., location, status, diagnostics, etc.) to a remote receiver utilizing transceiver 128.

As the mobile inventory tray moves about the factory floor it may provide itself with an accurate position of its location at all times using the GPS receiver 127. The GPS receiver 127 or equivalent system receives signals for determination of its position coordinates. This position information may include geographic longitude and latitude, as well as the height above normal zero or Cartesian coordinates in a manner that is commonly known. Those skilled in the art will appreciate that other guidance methods and systems including radar-based inertial navigation using gyroscopes, laser triangulation, cell-based locator logic (e.g., such as the emergency 911 positioning technology), and visual referencing may also be used by the mobile inventory tray to determine its position coordinates. The mobile inventory tray utilizes the position coordinates obtained from the GPS receiver 127 to calculate routes on the factory floor. It may also utilize position information when navigating to clear paths or queue with other mobile inventory trays, as will be described in detail shortly.

The mobile inventory tray may communicate its position and other data (e.g., the content of its inventory, its destination pack station, etc.) in a peer-to-peer fashion to other mobile inventory trays using RF communication as provided through receiver 128. In the embodiment illustrated by FIG. 3, a short-range communications medium such as a Bluetooth wireless protocol link or an ordinary infrared communication link may be used to provide a direct wireless link between mobile inventory trays. It should be understood that various wireless and terrestrial communications technologies may be employed. For example, the mobile inventory tray may be equipped with a device for communicating using the Global System for Mobile Communications ("GSM") protocol, the General Packet Radio Service ("GPRS") protocol, the 802.11b Wi-Fi networking protocol, and/or any other communication protocol/standard capable of communicating data. In a two-way mode of operation, transceiver 128 is equipped with an interface for both receiving and transmitting data over the direct wireless link. The wireless link may also communicate with the material handling system ("MHS") (not shown in this view) which interfaces with the individual mobile inventory trays. In this manner, the mobile inventory trays may be directed to various check-in stations and/or pack stations to process orders requested by the MHS. The mobile inventory tray may use the RF communication system provided by transceiver 128 and the GPS receiver 127 to navigate to appropriate check-in stations and/or pack stations.

Figure 4A:
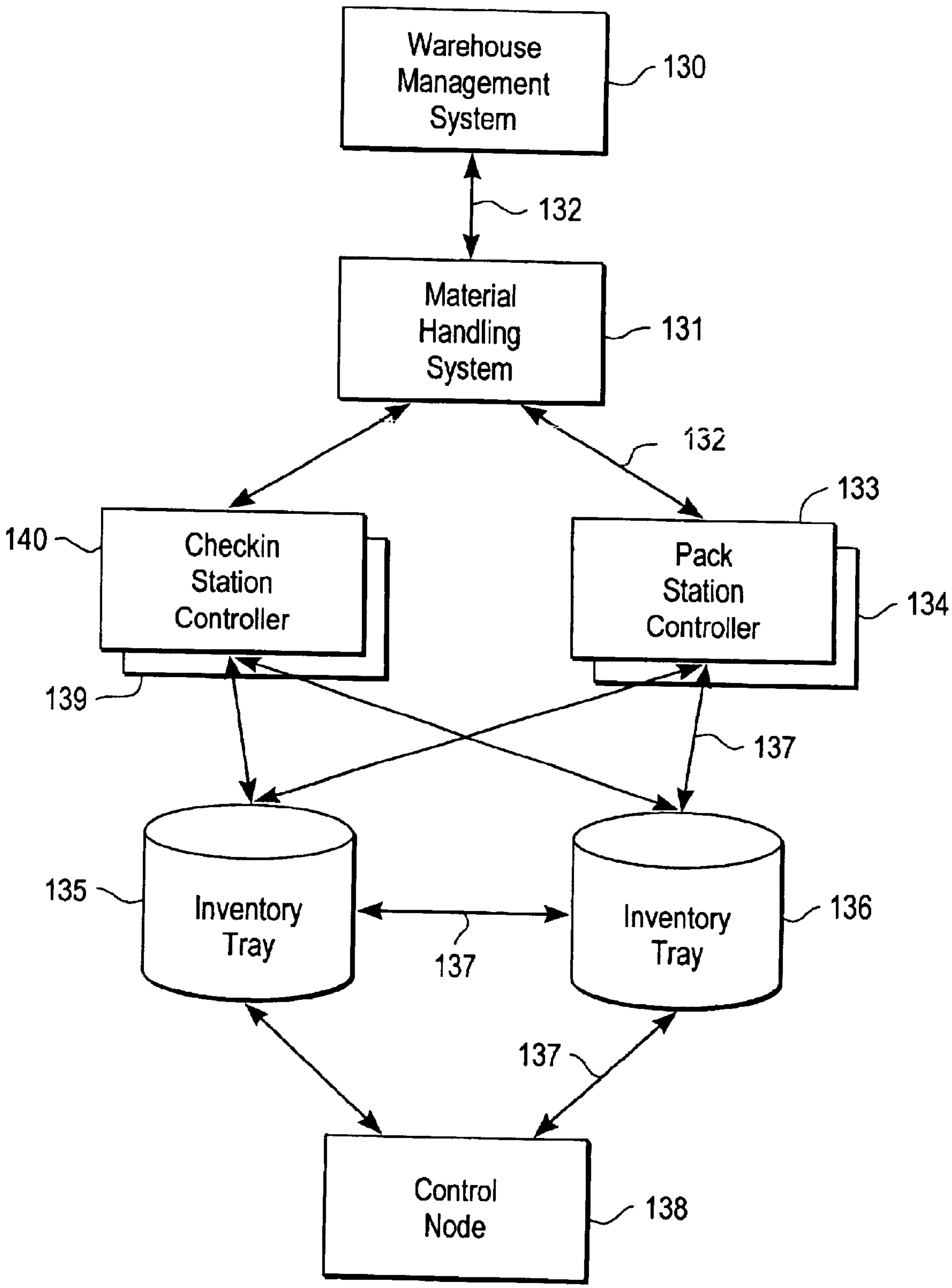
FIG. 4A is a block diagram of a system interface to a warehouse management system according to one embodiment of the present invention.

Referring now to FIG. 4A there is shown a block diagram of a system interface to a WMS 130 according to one embodiment of the present invention. The WMS 130 comprises a host computer that communicates data such as a production order (i.e., a request for an item(s) of inventory) to a Materials Handling System ("MHS") 131. The WMS 130 may be implemented as any one of a number of well known systems used to manage inventory in a factory or warehouse. WMS 130 transmits orders for shipments, tracks receipts, monitors factory inventory, etc. The WMS 130 transmits the request for the item(s) of inventory to the MHS 131 through a network connection, such as an intranet network 132. It should be noted that a variety of wireless and/or terrestrial communications technologies may also be used to transmit this request, including a wide area network ("WAN"), a local area network ("LAN"), or any other system of interconnections enabling two or more computers to exchange information. The MHS 131 then transmits the data using the above network connection methods to one or more pack station controllers 133, 134, etc. In turn, the pack station controller 133, 134, etc., wirelessly transmits the data request for the item(s) of inventory to one or more of the mobile inventory trays 135, 136 via a communication device in the pack station controller 133, 134, etc., using an RF link 137.

There may be multiple mobile inventory trays 135, 136, etc., moving about on a factory floor, with each mobile inventory tray 135, 136, etc., carrying a particular item(s) of inventory. Note, that in certain implementations, it is also possible for a single mobile inventory tray to carry multiple different types of inventory items in order to reduce the overall number of trays needed in the system. When the request for an item(s) of inventory is received by one or more mobile inventory trays 135, 136, etc., the mobile inventory trays transmit the request to peer mobile inventory trays 135, 136, etc. using the RF link 137. In a matter of seconds (or in a smaller increment of time), every mobile inventory tray 135, 136, etc., has received the request. Mobile inventory trays 135, 136, etc., containing the requested items(s) of inventory are instructed by their microprocessor 121 (see FIG. 3) to move to the pack station controller 133, 134, etc., all the while locating themselves on the factory floor with their GPS (not shown in this view). During movement, the mobile inventory trays 135, 136, etc. may also communicate with other control nodes 138 such as charging stations, obstacle markers, ramp markers, etc. using the RF link 137. When mobile inventory trays 135, 136, etc., arrive at the pack station controller 133, 134, etc., an operator (e.g., a human, a robot, etc.) removes the requested inventory item(s) from the mobile inventory trays 135, 136, etc. Pack station controller 133, 134, etc., tracks inventory item(s) requests as they are satisfied. This tracking function may be performed by scanning a barcode affixed to the inventory item(s). Pack station controller 133, 134, etc., communicates with the microprocessor 121 on mobile inventory trays 135, 136, etc., so that once an order is satisfied (e.g., requested item(s) is removed from the mobile inventory trays 135, 136, etc., and scanned by the barcode scanner) the mobile inventory trays 135, 136, etc., are released so that they may again move about the factory floor to fill other orders. The pack station controller 133, 134, etc., may also communication with the MHS 131 via the intranet network 132 or via some other wireless and/or terrestrial link, which in turn communicates with the WMS so that it may also track when order requests have been satisfied.

It should be noted that each mobile inventory tray 135, 136, etc., receives a supply of a particular item(s) of inventory at one or more check-in station(s) 139, 140, etc., where pallets may arrive from vendors on a regular basis. An operator at the check-in station 139, 140 etc. removes items of inventory from the pallets and places the items in the mobile inventory tray 135, 136, etc. For example, mobile inventory tray 135 may carry tubes of toothpaste while mobile inventory tray 136 may carry cartons of milk. Mobile inventory trays 135, 136, etc. know to move themselves to a check-in station 139, 140, etc. to replenish their inventory item(s) as they are depleted. When depleted, the empty mobile inventory tray may take on any new inventory item as determined by the operator at the check-in station. Mobile inventory trays 135, 136, etc., may also receive requests from the MHS 131 to move to check-in station 139, 140, etc. as more pallets arrive.

Figure 4B:
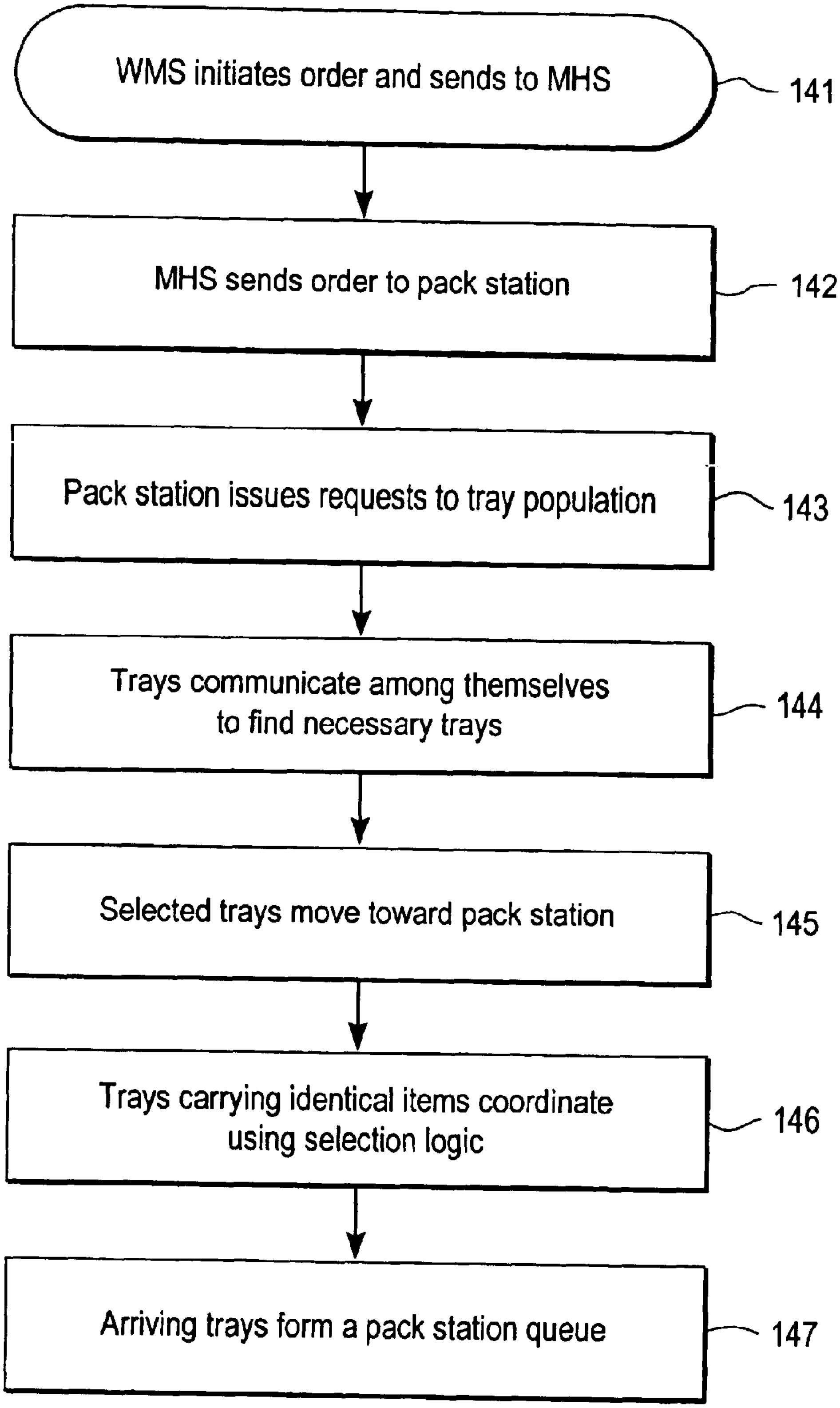
FIG. 4B is a flow chart showing the steps of an order fulfillment process using mobile inventory trays.

Another embodiment of the present invention provides for giving inventory certain intelligence. According to this embodiment, as depicted by FIG. 4B, not only can the pack station controller 143 communicate with the inventory, the inventory can also essentially communicate with other inventory via mobile inventory trays. FIG. 4B is a flow chart showing the steps of an order fulfillment process using mobile inventory trays interfacing with each other and with the material handling system of FIG. 4A. In one embodiment, an order (e.g., for bread and milk) is transmitted from the WMS 141 to the MHS. The MHS 142 then relays this order to a pack station controller. The pack station controller 143 transmits the order to mobile inventory trays using an RF link. The mobile inventory trays then communicate among themselves to locate the trays that contain the requested inventory items 144. When a tray does not contain a requested item it relays the request to peer trays. (e.g., "I do not have bread, but does anyone else have bread?"). The system relays the request all the way across the factory floor in this fashion. In a matter of seconds, every mobile inventory tray that contains requested items begins moving toward the pack station controller 145. As mobile inventory trays containing requested items move toward the pack station, other mobile inventory trays which are not part of this order coordinate to move aside. If two mobile inventory trays attempting to fill the same item request come within a short range of each other (e.g., 30 feet), they may communicate to determine who should fill the order 146. One mobile inventory tray may state that it has two loaves of bread, and another mobile inventory tray may state that it has five loaves. Then according to embedded tray selection algorithms, one tray moves aside and the other tray continues to move toward the pack station, because it is the optimum mobile inventory tray to fill the order. In this manner, the system is not only self-regulating but also self-optimizing in that item(s) of inventory that are requested more often drift closer to the pack station for more rapid response on subsequent order requests. As mobile inventory trays arrive at pack station, they communicate with each other to form an orderly queue 147 so that an operator can remove the requested items.

Figure 5:
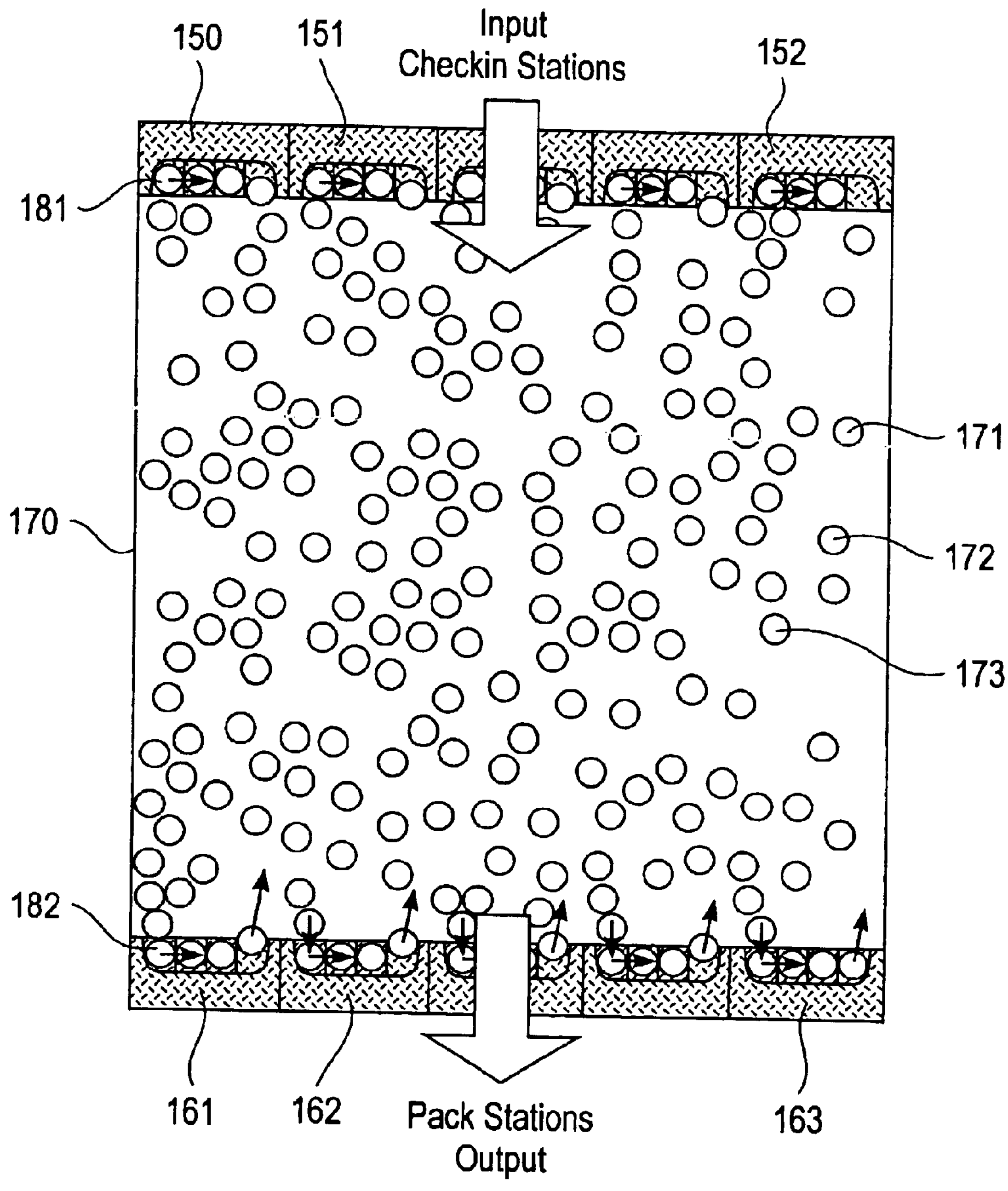
FIG. 5 is a top view of mobile inventory trays located on a factory floor according to one embodiment of the present invention.

Referring now to FIG. 5 there is shown a top view of multiple mobile inventory trays located on a factory floor according to one embodiment of the present invention. According to the embodiment illustrated by FIG. 5, check-in stations 150, 151, 152, etc., and pack stations 161, 162, 163, etc., are located on opposite sides of a factory floor 170. It should be noted that the configuration of the factory floor 170 and the location of the check-in stations 150, 151, 152, etc., and the pack stations 161, 162, 163, etc., in relation to the factory floor 170 may change depending on a variety of considerations (e.g., size and quantity of the inventory item(s) processed, types of inventory item(s), size of the factory floor, etc.). Mobile inventory trays 171, 172, 173, etc., are free to move about the factory floor 170 in any direction using the propulsion means disclosed above (see FIGS. 1 and 2). The mobile inventory trays 171, 172, 173, etc., may be directed to various check-in stations 150, 151, 152, etc., and/or pack stations 161, 162, 163, etc., to fill order requests by the MHS (not shown in this view). The mobile inventory trays 171, 172, 173, etc., form orderly queues as they enter the input areas 181, 182 of the check-in stations 150, 151, 152, etc., and/or pack stations 161, 162, 163, etc. Operators (not shown in this view) move inventory item(s) (not shown in this view) into and out of the mobile inventory trays 171, 172, 173, etc., as the mobile inventory trays move through the check-in 150, 151, 152, etc. and pack stations 161, 162, 163, etc.

Figure 6:
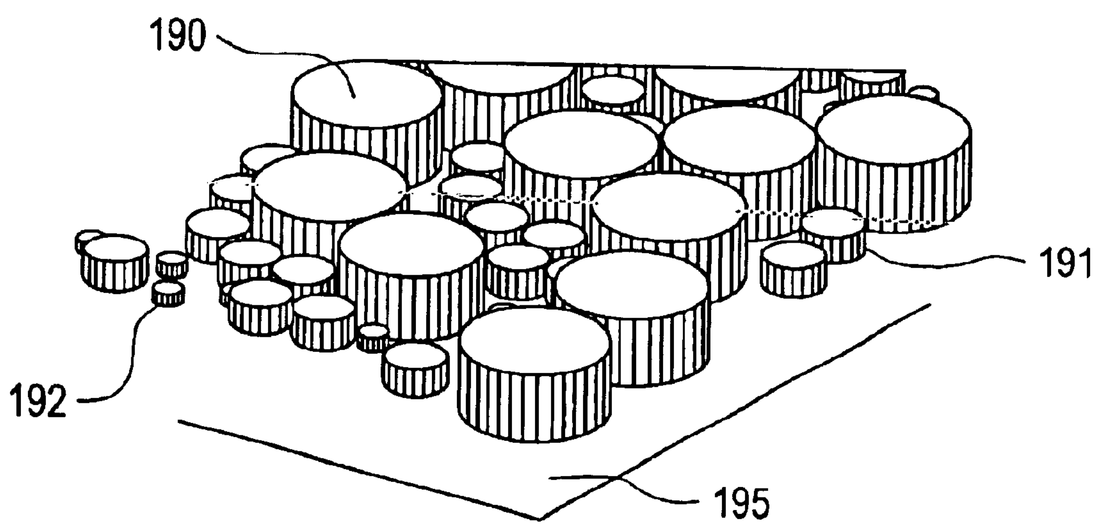
FIG. 6 is a perspective view of mobile inventory trays located on a factory floor according to one embodiment of the present invention.

Referring now to FIG. 6 there is shown a perspective view of multiple mobile inventory trays located on a factory floor according to one embodiment of the present invention. The mobile inventory trays 190, 191, 192, etc., may be of varying sizes and shapes. As shown in FIG. 6, the mobile inventory trays 190, 191, 192, etc., are circular and vary in size and shape. Mobile inventory trays 190, 191, 192, etc., may also be customized to transport specialty items (e.g., items that require special care). There are no predetermined storage locations for the mobile inventory trays 190, 191, 192, etc., other than that they exist somewhere within the designated inventory storage area on a factory floor 195. This is due to the fact that the mobile inventory trays 190, 191, 192, etc., are "smart" trays. They direct themselves wherever they need to be on the factory floor 195. As described herein, the location of the mobile inventory trays 190, 191, 192, etc., is not tracked, assigned, or controlled, until they are directed to a pack station or a check-in station (not shown in this view). In this sense, the material handling system and method of the present invention provides for a location-less inventory storage and retrieval system.

Figure 7:
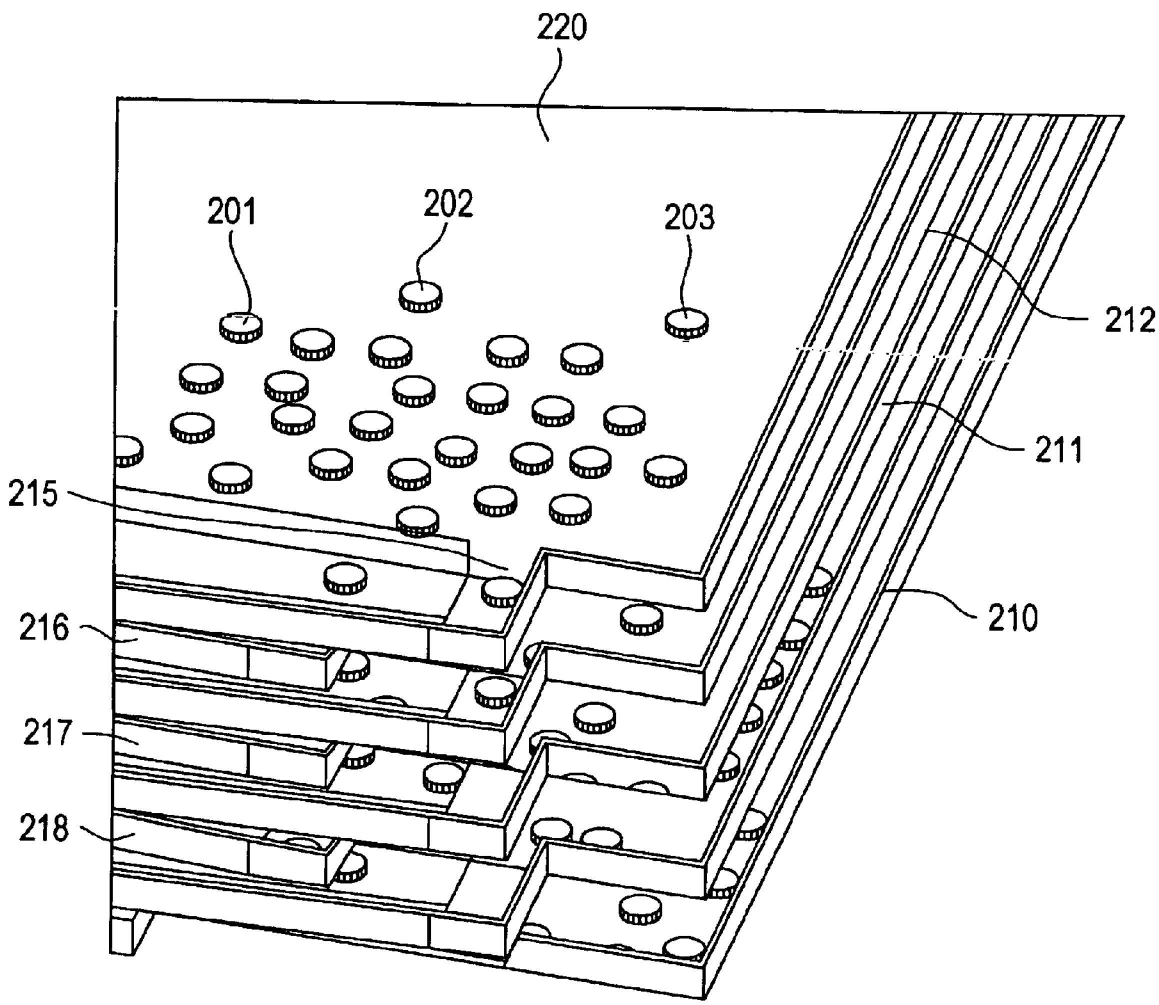
FIG. 7 is a perspective view of mobile inventory trays populating multiple vertical floor levels within a factory space according to one embodiment of the present invention.

Referring now to FIG. 7 there is shown is a perspective view of mobile inventory trays populating multiple vertical floor levels within a factory space according to one embodiment of the present invention. Mobile inventory trays 201, 202, 203, etc., are located and free to move about on all vertical floor levels 210, 211, 212, etc., within the factory space of a multi-floor inventory storage area 220. Floor enclosure openings 215 and ramp access 216, 217, 218, etc., is provided on every vertical floor level 210, 211, 212, so that the mobile inventory trays 201, 202, 203, etc. may move freely from floor to floor. Check-in stations and pack stations (not shown in this view) may be located on one floor level 210 or every floor level 211, 212, etc., depending on the configuration of the facility.

Figure 8:
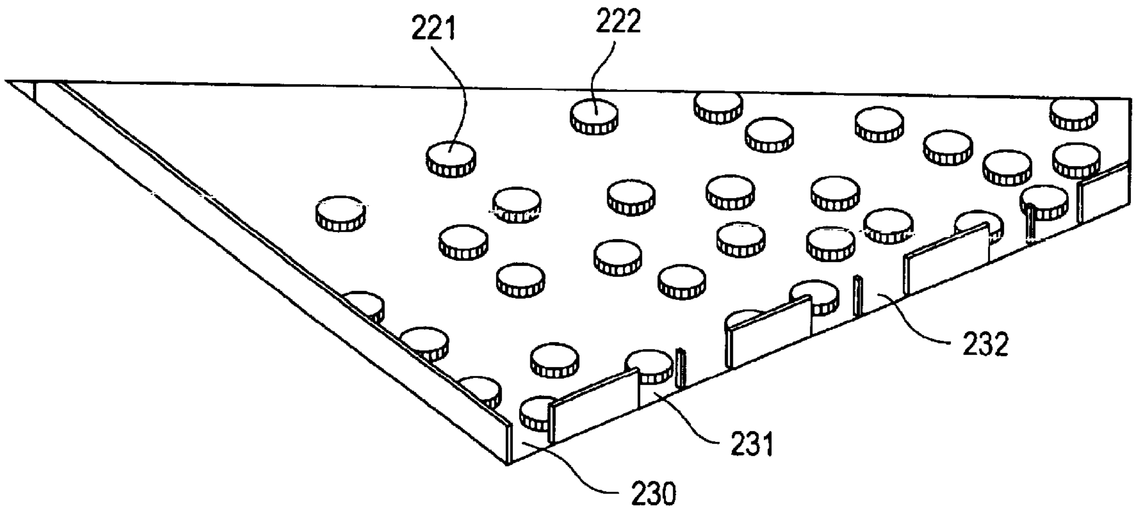
FIG. 8 is a perspective view of mobile inventory trays on a factory floor showing openings in the floor enclosure according to one embodiment of the present invention.

Referring now to FIG. 8 there is shown a perspective view of mobile inventory trays on a factory floor showing openings in the floor enclosure according to one embodiment of the present invention. In the embodiment illustrated by FIG. 8, mobile inventory trays 221, 222, etc., move through floor enclosure openings 230, 231, 232, etc. to gain access to pack stations, check-in stations etc. Ramps may be provided (see FIG. 7) for the mobile inventory trays 221, 222, etc., to move in any direction necessary including up and down the ramps to other inventory floor levels. In this way, mobile inventory trays 221, 222, etc., can respond to pick requests and move to pack station locations (not shown in this view) to fill orders. The mobile inventory trays may also move to other inventory floor levels using other types of mechanisms as well (e.g., elevators).

In the foregoing, a material handling system and method using mobile autonomous inventory trays and peer-to-peer communications has been disclosed. Although the present invention has been described with reference to specific exemplary embodiments, it should be understood that numerous changes in the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalent.

I claim:

1. A system for managing inventory items in a warehouse, comprising:

a plurality of mobile inventory trays having a communications link coupled to a microprocessor, each of the mobile inventory trays being self-powered and configured to move about the warehouse responsive to control signals of the microprocessor;

a material handling system (MHS) to send an order request to one or more of the mobile inventory trays via a wireless link, the order request associated with one or more inventory items requested by a customer placing an order; and one or more pack stations, one or more of the mobile inventory trays, in response to receiving the order request, transporting an inventory item associated with the order request to a pack station to be packaged.

2. The system of claim 1 wherein each of the mobile inventory trays is operable to communicate with every other mobile inventory tray so as to determine an optimal set of mobile inventory trays to fill the order request.

3. The system of claim I wherein each of the mobile inventory trays contains a guidance system that provides position signals to the microprocessor.

4. The system of claim 3 wherein the guidance system comprises a global positioning system (GPS).

5. The system of claim 3 wherein each of the mobile inventory trays uses the guidance system to clear paths on a factory floor with peer mobile in inventory trays or to queue with other mobile inventory trays.

6. The system of claim 2 wherein the optimal set of mobile inventory trays use their microprocessor to calculate and direct their own movement to the one or more pack stations.

7. The system of claim 1 wherein the MHS first transmits the order request to a pack station, the pack station transmitting the order request to the one or more mobile inventory trays using an RF transmitter.

8. The system of claim 1 wherein the one or more mobile inventory trays receive the order request using an RF system coupled to the microprocessor on each of the mobile inventory trays.

9. The system of claim 1 wherein a plurality of order requests may be processed simultaneously.

10. The system of claim 1 wherein one or more order requests may be processed in real-time.

11. A system for managing a factory, comprising:

a plurality of mobile inventory trays having a communications link coupled to a microprocessor, each of the mobile inventory trays being self-powered and configured to move about the factory responsive to control signals of the microprocessor;

a material handling system (MHS) to send data to one or more of the mobile inventory trays via a wireless link;

one or more pack stations, one or more of the mobile inventory trays, in response to receiving the data, transporting an inventory item associated with the data to a pack station to be packaged; and one or more check-in stations, one or more of the mobile inventory trays moving to the one or more of the check-in stations in response to the data.

12. The system of claim 11 wherein each of the mobile inventory trays is operable to communicate with every other mobile inventory tray so as to determine an optimal set of mobile inventory trays to fill an order request.

13. The system of claim 11 wherein each of the mobile inventory trays contains a global positioning system (GPS) that provides signals to the microprocessor.

14. The system of claim 11 wherein the mobile inventory trays use the GPS to navigate the factory floor.

15. The system of claim 12 wherein the optimal set of mobile inventory trays use their microprocessor to calculate and direct their own movement to the one or more pack stations.

16. The system of claim 12 wherein a pack station tracks order requests that have been filled by the optimal set of mobile inventory trays.

17. The system of claim 16 wherein the tracking information is transmitted to the optimal set of mobile inventory trays using a communication link between the pack station and the optimal set of mobile inventory trays.

18. The system of claim 17 wherein the mobile inventory trays move back to the factory floor once the tracking information indicates the pack operation is complete.

19. The system of claim 16 wherein the tracking information is transmitted to the MHS.

20. The system of claim 16 wherein the pack station tracks order requests using a barcode scanner to scan barcodes affixed to items of inventory.

21. The system of claim 11 wherein the mobile inventory trays receive items of inventory from the one or more check-in stations.

22. The system of claim 11 wherein the check-in stations transmit data to the mobile inventory trays using an RF transmitter.

23. The system of claim 11 wherein the factory comprises multiple vertical floor levels, the mobile inventory trays free to move about on all of the vertical levels.

24. The system of claim 23 wherein the mobile inventory trays access the vertical floor levels through enclosure openings coupled to ramps between the vertical levels.

25. The system of claim 11 wherein the mobile inventory trays are battery powered.

26. The system of claim 11 wherein the mobile inventory trays use drive wheels to move themselves in any direction on the factory floor.

27. The system of claim 11 wherein the MHS interfaces with a warehouse management system (WMS) through a network connection.

28. A mobile device for performing pick-and-pack operations in a warehouse, comprising:

a microprocessor;

a guidance system coupled to the microprocessor and used by the mobile device to navigate a warehouse floor;

a transceiver coupled to the mobile device, the transceiver used by the mobile device to respond to inventory movement requests transmitted to the mobile device by a material handling system (MHS) or by a plurality of other mobile devices; and a mobility mechanism used by the mobile device to propel itself in any direction on the warehouse floor to satisfy the requests to deliver or pick-up the items of inventory, the mobile device determining where it needs to propel itself on the warehouse floor autonomously using the microprocessor.

29. The mobile device of claim 28 wherein the mobile device is located on a warehouse floor with the plurality of other mobile devices.

30. The mobile device of claim 28 wherein the mobile device contains a tray to carry items of inventory.

31. The mobile device of claim 28 wherein the mobile device propels itself to a designated area on the warehouse floor to deliver or receive one or more items of inventory.

32. the mobile device of claim 28 wherein the mobile device contains a global positioning system (GPS) to provide position signals to the microprocessor, the GPS used by the mobile device to navigate the warehouse floor.

33. The mobile device of claim 31 wherein the designated area is a pack station.

34. The mobile device of claim 31 wherein the designated area is a check-in station.

35. The mobile device of claim 28 wherein the mobile device communicates with the plurality of other mobile devices using the transceiver to determine an optimal set of mobile devices to deliver the items of inventory.

36. The mobile device of claim 35 wherein a pack station tracks order requests that have been filled by the optimal set of mobile devices.

37. The mobile device of claim 36 wherein the tracking information is transmitted to the optimal set of mobile devices using a communication link between the pack station and the optimal set of mobile devices.

38. The mobile device of claim 37 wherein the optimal set of mobile devices move back to the warehouse floor once the tracking information indicates the pack operation is complete.

39. The mobile device of claim 37 wherein the communications link is a wireless RF link.

40. The mobile device of claim 34 wherein the mobile device receives items of inventory at the check-in station.

41. The mobile device of claim 40 wherein the check-in station transmits data to the mobile device using the RF transceiver.

42. The mobile device of claim 28 wherein the mobile device is operable to autonomously determine a rest location on the warehouse floor after satisfying a request and wherein the mobile device is operable to navigate to the rest location under its own direction.

43. The mobile device of claim 28 wherein the mobile device is battery powered.

44. The mobile device of claim 28 wherein the mobile device uses drive wheels to move in any direction on the warehouse floor.

45. The mobile device of claim 28 wherein the MHS is coupled to a warehouse management system by a network.

46. The mobile device of claim 28 wherein the MHS transmits requests to one or more pack stations.

47. The mobile device of claim 28 wherein the MHS transmits requests to one or more check-in stations.

48. A method for managing items of inventory comprising:

providing a plurality of microprocessor-based mobile inventory trays configured to move within a warehouse;

transmitting an order request to the mobile inventory trays;

selecting, by the mobile inventory trays, one or more optimum mobile inventory trays to satisfy the order request; and moving, by the one or more optimum mobile inventory trays, to a designated pack station to fill the order request.

49. The method of claim 48 further comprising providing a communication system coupled to provide commands to the microprocessor of each of the mobile inventory trays.

50. The method of claim 49 wherein the communication system is a radio frequency (RF) transceiver.

51. The method of claim 48 wherein the selecting is made by communication between the mobile inventory trays using the RF transceiver.

52. The method of claim 48 further comprising providing a guidance system coupled to the microprocessor on each of the mobile inventory trays for the mobile inventory trays to determine their three-dimensional position coordinates within a facility.

53. The method of claim 52 wherein the guidance system is a global positioning system (GPS).

54. The method of claim 52 wherein the plurality of mobile inventory trays each uses the guidance system to clear paths on a warehouse floor with peer mobile inventory trays or to queue with other mobile inventory trays.

55. The method of claim 48 wherein the optimum mobile inventory trays are instructed by their microprocessor to move to the designated pack station.

56. The method of claim 48 wherein a material handling system (MHS) transmits the order request to the designated pack station, the designated pack station transmitting the order request to one or more mobile inventory trays using a communication system.

57. The method of claim 48 further comprising processing one or more order requests simultaneously.

58. The method of claim 48 further comprising tracking order requests that have been filled by the optimum mobile inventory trays; and transmitting the tracking information to the optimum mobile inventory trays using a communication link between the designated pack station and the optimum mobile inventory trays.

59. The method of claim 58 wherein the optimum mobile inventory trays move back to the warehouse floor once the tracking information indicates the operation is complete.

60. The method of claim 58 wherein the tracking of order requests is implemented using barcodes on items of inventory and a barcode scanner coupled to the pack station computer.

61. The method of claim 48 further comprising providing one or more check-in stations, the one or more of the mobile inventory trays moving to the one or more check-in stations when they are depleted or in response to a request to pick up items of inventory transmitted to the mobile inventory trays.

62. The method of claim 61 wherein the check-in stations transmit the request using an RF transmitter.

63. The method of claim 61 wherein the one or more mobile inventory trays move to the check-in stations to pick-up the items of inventory.

64. The method of claim 48 further comprising providing multiple vertical floor levels in the warehouse, the mobile inventory trays free to move about on all of the vertical floor levels.

65. The method of claim 64 wherein the mobile inventory trays access the vertical floor levels through enclosure openings coupled to ramps between the vertical levels.

66. The method of claim 48 wherein the mobile inventory trays are battery powered.

67. The method of claim 48 wherein the mobile inventory trays use drive wheels to move themselves in any direction on the surface area.

68. The method of claim 48 further comprising providing a material handling system (MHS) to transmit the order requests to the mobile inventory trays.

69. The method of claim 68 wherein the MHS is coupled to a warehouse management system (WHS) by a network.

70. The method of claim 48 further comprising processing one or more order requests in real-time.

71. The system of claim 1, wherein each of the plurality of mobile inventory trays is operable to store inventory items.

72. The system of claim 1, wherein each of the plurality of mobile inventory trays is operable to transport a storage apparatus, the storage apparatus operable to store inventory items.

73. The system of claim 11, wherein each of the plurality of mobile inventory trays is operable to store inventory items.

74. The system of claim 11, wherein each of the plurality of mobile inventory trays is operable to transport a storage apparatus, the storage apparatus operable to store inventory items.

75. The method of claim 48, wherein each of the plurality of mobile inventory trays is operable to store inventory items.

76. The method of claim 48, wherein each of the plurality of mobile inventory trays is operable to transport a storage apparatus, the storage apparatus operable to store inventory items.

* * * * *